United States Patent [19]
Craven et al.

[11] Patent Number: 5,158,688
[45] Date of Patent: Oct. 27, 1992

[54] PROCESS FOR REMOVING INORGANIC GELS AND INCOMPRESSIBLE SOLIDS FROM ACIDIC MEDIA

[75] Inventors: John S. Craven; Herbert Valdsaar, both of Wilmington, Del.

[73] Assignee: E. I. Du Pont de Nemours and Company, Wilmington, Del.

[21] Appl. No.: 497,876

[22] Filed: Mar. 19, 1990

[51] Int. Cl.$^5$ .............................. C02F 1/56
[52] U.S. Cl. ................. 210/734; 210/738; 210/912
[58] Field of Search ........ 210/709, 725, 729, 732–735, 210/738, 783, 805, 912–914

[56] References Cited

U.S. PATENT DOCUMENTS

| | | | |
|---|---|---|---|
| 3,959,465 | 5/1976 | Kurata et al. | 423/86 |
| 4,137,164 | 1/1979 | Coscia et al. | 210/734 |
| 4,141,827 | 2/1979 | Coscia et al. | 210/734 |
| 4,382,864 | 5/1983 | Hashimoto et al. | 210/738 |
| 4,569,768 | 2/1986 | McKinley | 210/734 |
| 4,676,913 | 6/1987 | Easterly, Jr. et al. | 210/734 |
| 4,698,171 | 10/1987 | Bertini et al. | 252/60 |
| 4,720,346 | 1/1988 | Flesher et al. | 210/732 |

FOREIGN PATENT DOCUMENTS

| | | |
|---|---|---|
| 6031058 | 9/1975 | Japan. |
| 865837 | 9/1981 | U.S.S.R. |
| 1204568 | 1/1986 | U.S.S.R. |
| 1570282 | 6/1980 | United Kingdom. |

*Primary Examiner*—Tom Wyse

[57] ABSTRACT

A process for removing inorganic gels and dispersed, particulate incompressible solids from a highly acid aqueous slurry (e.g., pH of $-2$ to $+3$) and a soluble metallic chloride content (e.g., 3 to 50%) involving rapidly and intimately contacting the slurry with a cationic Mannich polyacrylamide of molecular 4–15 million until a desired amount of gel and particulate solids are flocculated. By slowly and gently mixing a floc of the desired size is formed which is then removed. The process is especially suited for treating slurries produced by water quenching the hot metal chlorides and blowover ore and coke from a $TiO_2$ chlorinator after $TiCl_4$ has been removed.

17 Claims, 1 Drawing Sheet

PROCESS FOR REMOVING INORGANIC GELS AND INCOMPRESSIBLE SOLIDS FROM ACIDIC MEDIA

BACKGROUND OF THE INVENTION

In mining, ore beneficiation, and certain industrial processes, there often are produced highly acidic slurries containing inorganic gels and dispersed, particulate incompressible solids. Ordinarily, dispersed solids can be recovered by filtration, or settling which is often aided by flocculating agents. However, the presence of gels clog filters and greatly slow settling rates, and thus render such removal means ineffective. Also, many polymeric flocculants appear not to function well in this media because they are degraded by the highly acidic conditions and produce a poor quality floc.

A good example of the foregoing problem is in the chloride process for producing titanium dioxide pigment. In such process, titanium containing ore or material is chlorinated in a fluidized bed reactor in the presence of coke or other carbonaceous material. Metal chlorides and fine, particulate coke and ore are entrained in the hot gases exiting the chlorinator. Subsequently, the titanium tetrachloride is separated from the other materials and is processed into titanium dioxide pigment. The byproduct stream containing various metal chlorides and coke and ore is then quenched in water.

In such chloride process, it would be desirable to be able to separate the coke and ore from the soluble metal chlorides. However, because the slurry is highly acidic and contains inorganic gels formed from certain of the metal chlorides, the foregoing removal problems are present. Thus, a process is needed to recover the valuable components from this byproduct stream.

The following information is provided which may be of interest to this invention:

U.S. Pat. No. 3,959,465 discloses a process for concentrating titanium minerals by leaching with an acid in the presence of a polyacrylamide surfactant, whereby formation of very fine particles of the titanium mineral is inhibited, while iron is removed.

U.S. Pat. No. 4,698,171 describes agents for selective flocculation of fine aqueous suspensions of titanium and iron ores comprising polymers containing olefinic monomer units based on 3,4-methylenedioxy- or 3,4-dihydroxybenzene derivatives.

Russian patent SU-1204568 discloses a process for rapid clarification of sulfuric acid ilmenite slurries by flocculating with an aminomethylated copolymer of acrylamide with ethanolamine acrylate or the Na salt of maleic anhydride.

Russian patent SU-865837 discloses a process for purifying aqueous effluent from the sulfate process for making $TiO_2$. The effluent containing H $TiO_2$, and metal salts is neutralized and freed from metal ions by a combined operation of flocculation with polyacrylamide and flotation of the solid phase with alkyl-benzyl-dimethyl-ammonium chloride surfactant.

Belgian patent BE 848271 discloses a process for clearing acid titanium sulfate liquor obtained in the sulfate process for making $TiO_2$, using water soluble methylolated acrylamide polymers as flocculating agent.

Japanese patent 6,031,058 discloses the manufacture of iron oxide with reduced silicon content. The process includes using a high molecular weight cationic polyacrylamide flocculant.

Japanese Published Patent Application 123,511 (published 9/29/75) discloses a process for purifying $TiO_2$ ores by leaching with a chelating agent, surfactant, and polyacrylamide coagulant.

SUMMARY OF THE INVENTION

In accordance with this invention there is provided a process for removing inorganic gels and dispersed, particulate incompressible solids from an aqueous slurry having a pH of about $-2$ to $+3$ and a soluble metallic chloride content of about 3 to 50 percent by weight, based on the total weight of the slurry, comprising:

(a) rapidly and intimately contacting the slurry with an effective amount of a cationic Mannich polyacrylamide having an average molecular weight of about 4–15 million until the desired amount of gel and particulate solids are flocculated, (b) slowly and gently mixing the product of step (a) until floc of the desired size is formed, and (c) removing the floc from the product of step (b).

It has been found that the process of this invention can rapidly and efficiently flocculate both gels and dispersed solids contained in aqueous slurries. The flocculated materials can then be rapidly and efficiently removed by conventional industrial processes such as screening, compression belt filtering, settling, etc.

DETAILED DESCRIPTION OF THE INVENTION

Figure 1:
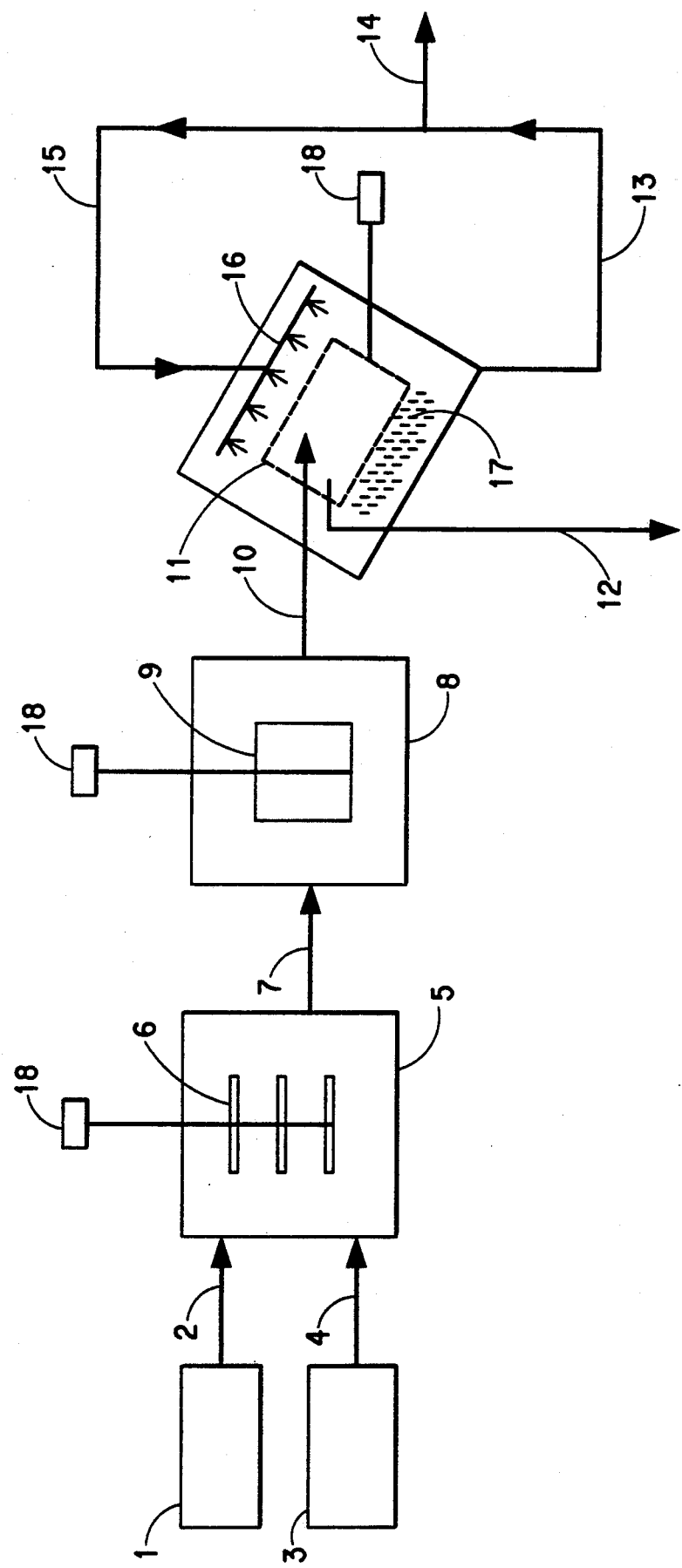

The following provides a detailed description of this invention. It should be noted that the process of this invention can be carried out on a continuous or batch basis.

THE MANNICH POLYACRYLAMIDE

The flocculant useful in this invention is a Mannich polyacrylamide. Such polymers are well known and are the product of the condensation reaction of an amine (such as dimethyl amine) with an aldehyde (which is usually formaldehyde) and a polyacrylamide. A typical reaction is as follows:

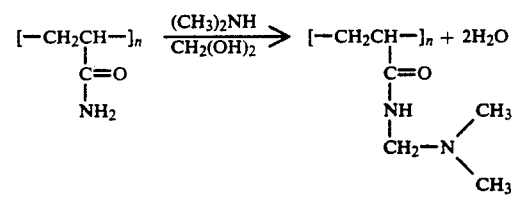

The production of Mannich polyacrylamides is described in more detail in C. J. Mc Donnald and R. H. Beaver, "The Mannich Reaction of Poly(acrylamide)" *Macromolecules*, Volume 12, No. 2, March-April 1979, which is hereby incorporated by reference.

Ordinarily, the Mannich polyacrylamides used in this invention will have an average molecular weight of about 4–15 million and preferably about 8–10 million. They also should be cationic, and preferably at least about 25 percent of the sites on the polyacrylamide which can take a positive charge will be so charged. Especially preferred are Mannich polyacrylamides having about a 50 percent charge.

Preferably, the Mannich polyacrylamide will be contained in a solution or dispersion in aqueous media.

Most preferably, the polyacrylamide will be contained in a solution in aqueous media. If a solution is used, the Mannich polyacrylamide preferably will be present in an amount of about 0.001-0.2 percent, based on the total weight of the solution.

The amount of Mannich polyacrylamide used can readily be determined by making several experimental tests. Sufficient polyacrylamide should be used to form the desired amount of floc. However, care should be taken not to use too much polyacrylamide because this will be cost inefficient and may cause stickiness and clogging in the processing equipment. The amount of Mannich polyacrylamide required can depend on the amount of solids in the slurry, the amount of soluble metallic chlorides in the slurry, the pH of the slurry, and the percent charge of the Mannich polyacrylamide. When the soluble metal chloride is present in an amount of about 20-50 weight percent, it is believed that the volume ratio of 0.1 weight percent solution of Mannich polyacrylamide to slurry will be about 1:3 to 1:10.

The Slurry

The slurries which can be treated with the process of this invention ordinarily will have a pH of about $-2$ to $+3$ and will contain dispersed incompressible solids, soluble metal chlorides, and inorganic gels.

Typically, the incompressible solids will be inorganic, have a size of about 0.1-50 microns, and a density of about 1-4.0. The solids generally will be present in an amount of about 0.1-20 percent and preferably about 0.1-10 percent by weight, based on the weight of the slurry.

Examples of typical incompressible solids include finely divided minerals, ore, coke, metals, and other inorganic materials and compounds. The process of this invention is especially useful for removing particulate coke and ore particles which are entrained in the hot gases exiting a fluidized bed chlorinator for a titanium dioxide production process.

Generally, the metallic chlorides will be present in an amount of about 3-50 percent by weight, based on the total weight of the slurry. Often, the metallic chlorides will be present in an amount of at least about 10-50 percent by weight.

The process of this invention is believed to work well with any metal chloride or mixtures of metal chlorides which are soluble in the aqueous, acidic slurry media. Examples of such metal chlorides include Fe, Ca, Ce, La, Mg, Nd, P, Pb, Na, Sr, V, Zn, Ba, Cr, Cu, Mn, Nb, Ni, Si, Ti, and Zr. The process of this invention is especially suited for treating slurries wherein iron chloride is the predominant metal chloride. Often, the iron chloride will be present in an amount of about 40-98 percent by weight, based on the total weight of the metal chlorides present.

The process of this invention is also believed to work well in the presence of any inorganic gel. Typically, the gel will comprise at least one hydroxylated metal gel. One example of such a gel is that which forms due to a high concentration of ferric chloride in the slurry. Other gels can be formed from Ti, Nb, and/or Zr chlorides. Another example of an inorganic gel is that formed from metal phosphates in the slurry. The gel often will be present in the amount of about 0.1-5 percent, and preferably about 0.1-2 percent, based on the total weight of the slurry.

The process of this invention is especially suited for treating slurries produced by water quenching the hot metal chlorides and blowover ore and coke from a titanium dioxide chlorinator after titanium tetrachloride has been removed. Titanium dioxide chlorinators are well known and are disclosed for example, in U.S. Pat. Nos. 2,701,179, and 3,848,051, which are hereby incorporated by reference.

Flocculation and Floc Growth

This step of the process of this invention involves (a) rapidly and intimately contacting the slurry with an effective amount of a cationic Mannich polyacrylamide until the desired amount of gel and particulate solids are flocculated, and (b) slowly and gently mixing the product of step (a) until floc of the desired size is formed.

Rapid and intimate contacting during step (a) is desirable because it has been found that the the highly acidic media of the slurry can degrade the Mannich polyacryamide. Therefore, preferably, the contacting should be designed to flocculate the desired amount of gel and particulate solids before the Mannich polyacrylamide is significantly degraded. Also, when carrying out the contacting, care should be taken not to create excessive shearing force which may degrade significant amounts of polyacrylamide and the flocs which are formed. The optimum conditions for minimizing degradation of the polyacrylamide and flocs due to the acidic media and excessive shearing force can easily be determined for the particular slurry and polyacrylamide used by conducting several experimental tests under varying conditions. Of course, if desired, additional Mannich polyacrylamide can be added to compensate for any which is degraded. However, the most efficient conditions often will be obtained when the addition of additional polyacrylamide is minimized.

The contacting can be carried out by agitation, mixing, stirring, blending and the like. Suitable means for carrying out the contacting include mixing or stirring with a turbine or impeller blade in a suitable vessel. Other suitable means include introducing the slurry and the polyacrylamide into (1) the inlet of a conduit wherein turbulent flow is maintained, or (2) the inlet of a pump. Typical contacting times are about 1-180 seconds, preferably about 1-120 seconds and most preferably about 1-60 seconds. An especially preferred range is about 5-30 seconds.

After the rapid and intimate contacting, step (b) will be carried out, i.e., the slurry will be slowly and gently mixed until flocs of the desired size are formed. This step should utilize low shear mixing because too much shear can degrade the flocs which have been formed in step (a). Typically, this step will be carried out for at least about 15 seconds, preferably for at least about 60 seconds, and most preferably about 150 seconds. Often there will not be significant additional floc growth after about 300 seconds.

One can determine whether or not the desired amount of flocculation has taken place in step (a) and whether or not floc of the desired size has been formed in step (b) by making some experimental tests. Preferred conditions have been determined when the maximum amount of dispersed solids and gels can be removed and the remaining liquid, after removal of the floc, is relatively clear. For example, if step (a) has been carried out satisfactorily, as indicated by the formation of a good quantity of flocs and relatively clear aqueous media, but the floc is not retained on the filter or the screen, then it is likely that additional time, additional Mannich polyacrylamide, and/or less vigorous mixing is needed for the floc growth. Conversely, if the floc is readily removed by filtration or screening, but insufficient solids are removed, then conditions must be optimized to enhance flocculation such as more rapid contacting and/or additional Mannich polyacrylamide. If excessive stickiness is observed, especially during removal of the floc, then it is likely that too much Mannich polyacrylamide is being used or there is insufficient intimate contacting during step (a). Finally, if the aqueous media is cloudy after step (a) then it is likely that additional Mannich polyacrylamide is needed or conditions must be optimized (such as more vigorous mixing) to enhance flocculation.

Removing the Flocculated Material

The flocculated material can be removed by any suitable means, including screening, compression belt filtering, settling, centrifuging, and decanting. Preferred is screening and compression belt filtering. Typically, the pore size for the screen will be about 0.1–1 millimeters, preferably about 0.5–0.7 millimeters, and most preferably about 0.6 millimeters.

DRAWING

FIG. 1 represents a preferred embodiment of this invention which operates in a continuous manner. FIG. 1 is described in more detail in Example 1.

EXAMPLE 1

In the following example, all percentages are on a weight basis unless otherwise specified.

With reference to FIG. 1, Slurry Holding Tank 1 has a size of 300 gallons. Slurry exits through Slurry Feed Line 2 at a rate of about 2 gallons per minute and is fed to Dispersion Tank 5.

The slurry is a stable, aqueous dispersion of particulate coke and ore and contains various soluble metal chlorides and inorganic gels formed from the ferric chloride, and chlorides of Ti, Nb, Zr, and P. The pH is about −2, and the specific gravity is 1.51. The coke and ore is present in the amount of 6.75 percent. The slurry is produced by water quenching (a) the hot metal chlorides produced from a titanium dioxide chlorinator, and (b) coke and titanium containing ore blowover from such chlorinator. Such quenching takes place after the titanium tetrachloride has been removed. The slurry contained the following amounts of metal chlorides per liter: 153 grams Fe; 7.4 grams Mn; 5.2 grams Al; and 4.5 grams Ti. There also was a combined total of 5.4 grams per liter of the following metal chlorides: Zr, Ca, Ce, La, Nd, P, Pb, Na, Sr, V, Zn, Ba, Cr, Cu, Nb, Ni, and Si.

Polyacrylamide Feed Tank 3 contains a 0.11 percent solution of a 50 percent cationic charged (based on the total number of sites which can be charged) Mannich polyacrylamide having an average molecular weight of about 8 million. The solution is fed through Feed Line 4 to Dispersion Tank 5 at a rate of about 0.25 gallons per minute.

Dispersion Tank 5 has four vertical baffles welded to its interior surface and has a size of one gallon. Rapid and intimate contacting is carried out in the Dispersion Tank 5 by the action of Turbine 6, which turns at a speed of about 550 revolutions per minute. The turbine has three impellers, each of which are one-half inch high and have a width of about one-half the diameter of the tank. Each impeller set has four blades which cross at right angles.

Slurry exits the Dispersion Tank 5 through Dispersed Feed Line 7 at a rate of about 2.25 gallons per minute and enters Flocculation Growth Tank 8. The Flocculation Growth Tank 8 has four vertical baffles welded to its interior surface. The Flocculation Growth Tank 8 has a size of 5 gallons. Turbine 9 has one impeller of four blades which cross at right angles. The blades are 9 inches high, and the impeller has a width of about one-half of the diameter of the tank. The turbine turns at a speed of 130 revolutions per minute.

The flocculated slurry exits the Flocculated Growth Tank 8 through Flocculated Feed Line 10 at a rate of about 2.25 gallons per minute and enters Continuous Drum Screen 11. The Continuous Drum Screen 11 turns at a speed of 18 revolutions per minute and has 0.6 millimeter diameter pores, which constitute about 20 percent of the total surface area.

The thickened slurry exits through Thickened Slurry Exit Line 12 with the aid of an auger (not shown) which scrapes the interior surface of the continuous Drum Screen 11. Analysis of the slurry shows that about 98 percent of the total dispersed solids have been recovered. Clear liquor exits the Continuous Drum Screen 11 in the form of drops 17 and enter Recycle Line 13 at a rate of about 3.4 gallons per minute. The clear liquor has a specific gravity of 1.39 and contains about 0.2 percent solids.

At point 15, the flow rate is about 2.0 gallons per minute, and the pressure is about 10 pounds per square inch gage. The clear liquor exits the Spray Manifold 16 and provides washing action which enhances separation and keeps the voids in the screen open. Fluid exits through outlet 14.

Motors 18 provide power to Turbine 6, Turbine 9, and continuous Drum Screen 11.

The invention claimed is:

1. Process for removing inorganic gels and dispersed, particulate incompressible solids from an aqueous slurry having a pH of about −2 to +3 and a soluble metallic chloride content of about 3 to 50 percent by weight, based on the total weight of the slurry, comprising:
   (a) rapidly and intimately contacting the slurry with an effective amount of a cationic Mannich polyacrylamide having an average molecular weight of about 4–15 million until the desired amount of gel and particulate solids are flocculated,
   (b) slowly and gently mixing the product of step (a) until floc of the desired size is formed, and
   (c) removing the floc from the product of step (a).

2. The process of claim 1 wherein the contacting is carried out by mixing the slurry with the Mannich polyamide contained in aqueous media.

3. The process of claim 1 wherein
   (i) step (a) is carried out over a period of about 1–180 seconds, and
   (ii) step (b) is carried out over a period of at least about 15 seconds.

4. The process of claim 1 wherein the Mannich polyacrylamide is at least about 25 percent charged.

5. The process of claim 1 wherein the Mannich polyacrylamide has an average molecular weight of about 8–10 million.

6. The process of claim 1 wherein the floc from step (b) is removed by screening or compression belt filtering.

7. The process of claim 1 wherein the slurry is that produced by water quenching the hot metal chlorides and blowover ore and coke from a titanium dioxide chlorinator after titanium tetrachloride has been removed.

8. The process of claim 7 wherein the contacting is carried out by mixing the slurry with the Mannich polyacrylamide contained in aqueous media.

9. The process of claim 7 wherein
(i) step (a) is carried out over a period of about 1-180 seconds, and
(ii) step (b) is carried out over a period of at least about 15 seconds.

10. The process of claim 7 wherein the Mannich polyacrylamide is about 25 percent charged.

11. The process of claim 7 wherein the polyacrylamide has an average molecular weight of about 8-10 million.

12. The process of claim 7 wherein the floc is removed by screening or belt compression filtering.

13. The process of claim 7 wherein the inorganic gel is present in an amount of about 0.1-5 percent by weight.

14. The process of claim 7 wherein
(a) the contacting is carried out by mixing the slurry with the Mannich polyacrylamide contained in aqueous media,
(b) step (a) is carried out over a period of about 1-180 seconds, and step (b) is carried out over a period of at least 15 seconds,
(c) the Mannich polyacrylamide is at least 25 percent charged,
(d) the Mannich polyacrylamide has an average molecular weight of about 8-10 million,
(e) the floc is removed by screening or belt compression filtering, and
(f) the inorganic gel is present in and amount of about 0.1-5 percent by weight, based on the total weight of the slurry.

15. The process of claim 14 wherein the contacting takes place over a period of less than about one minute.

16. The process of claim 14 wherein the contacting takes place over a period of less than about one-half minute.

17. The process of claim 14 wherein the floc is removed by a screen, and a portion of the product from step (c), after the floc is removed, is recycled to wash the screen.

* * * * *